E. A. LARSON.
SPEEDOMETER DRIVE GEAR.
APPLICATION FILED JUNE 23, 1913.
1,161,483.   Patented Nov. 23, 1915.
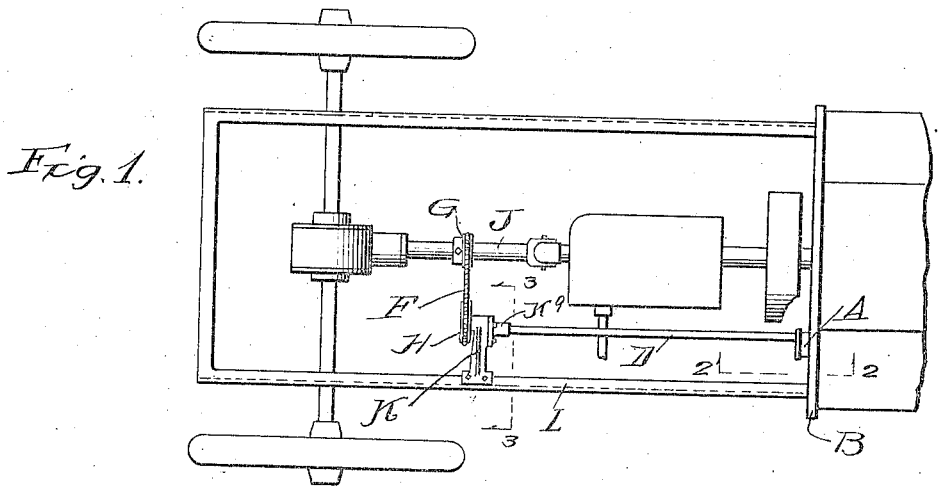
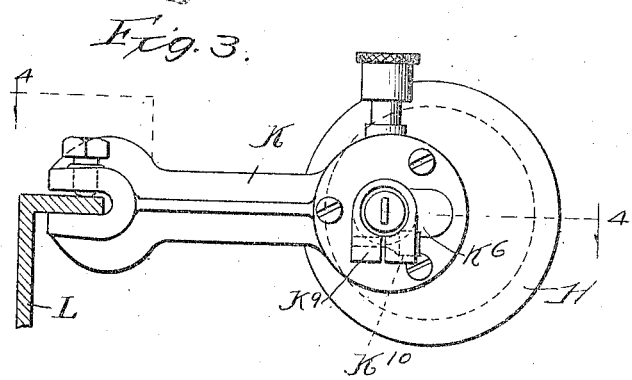
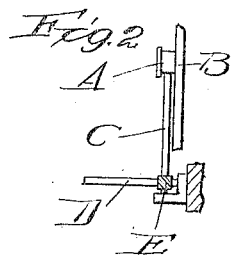
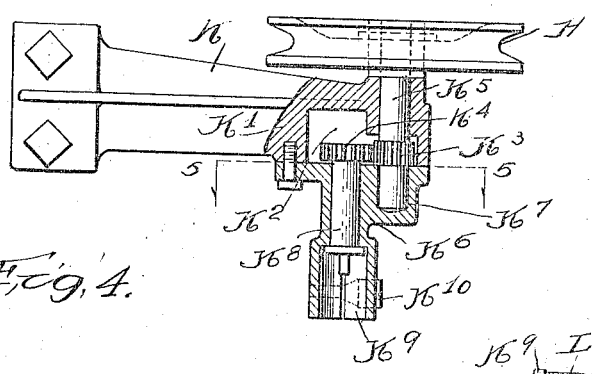
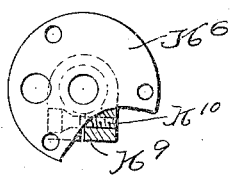
Inventor
Edward A. Larson.

UNITED STATES PATENT OFFICE.

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER DRIVE-GEAR.

1,161,483.　　　　　Specification of Letters Patent.　　Patented Nov. 23, 1915.

Application filed June 23, 1913.　Serial No. 775,186.

*To all whom it may concern:*

Be it known that I, EDWARD A. LARSON, a citizen of the United States, residing at Chicago, in the county of Cook and State of Illinois, have invented new and useful Improvements in Speedometer Drive-Gears, of which the following is a specification, reference being had to the accompanying drawings, forming a part thereof.
The purpose of this invention is to provide a simple and efficient gearing for transmitting rotation from the propeller shaft of a motor driven vehicle to a speedometer mounted in any convenient position upon the vehicle, preferably on the dash-board.

The invention consists of the features and elements described and shown in the drawings as more particularly indicated by the claims.
In the drawings:—Figure 1 is a partial plan view of an automobile chassis showing the drive gear installed thereon. Fig. 2 is a detail section taken as indicated at line 2—2 on Fig. 1. Fig. 3 is a detail section taken as indicated at line 3—3 on Fig. 1. Fig. 4 is a plan view of the parts of the device shown in Fig. 3 with certain parts in section as indicated at line 4—4 on Fig. 3. Fig. 5 is a detail section taken as indicated at line 5—5 on Fig. 4.

Since the rotational speed of the so-called propeller shaft of a motor driven vehicle usually bears a fixed relation to the speed of rotation of the road wheels, it is convenient and often preferable to connect a speed-indicating instrument directly to such propeller shaft. In the present instance the speedometer, A, shown mounted on the dash-board, B, is provided with a jointed shaft formed of a vertical and a horizontal section, C and D, respectively, operatively connected by spiral gears at, E, and the rotation of the propeller shaft is transmitted to the speedometer, A, through a belt, F, passing over pulleys, G and H, which are, respectively, carried by the propeller shaft, J, and the transmitting device, K which is mounted on the frame, L, for positioning the fore-and-aft extending shaft, D, laterally with respect to the propeller shaft. Preferably the belt, F, is of the well known coiled wire type, thus being sufficiently elastic and flexible to accommodate itself to variations in the position of the propeller shaft incident to the spring action of the vehicle in view of the lateral relation of the shaft, D, to the propeller shaft. It will be understood that for the sake of efficiency in the transmission of motion from the pulley, G, to the pulley, H, it is desirable that these pulleys be of nearly equal diameters, but since such a relation of sizes would not secure the necessary modification of the propeller shaft speed for use in the speedometer, A, there is provided in the supporting arm, $K^1$, a housing, $K^2$, within which are journaled the speed-changing gears, $K^3$ and $K^4$, connected, respectively, to the shaft of the pulley, H, and to the shaft, D, above mentioned. As shown, the housing is provided with a journal bearing at $K^5$, for the shaft of the gear, $K^3$, and the cover piece, $K^6$, is formed to furnish an additional bearing for this shaft at, $K^7$, and also a bearing for the shaft of the gear, $K^4$, at $K^8$. This cover piece may also be provided with a split socket, $K^9$, and clamp screw, $K^{10}$, for securing a tubular housing for the shaft, D, when one is provided. It will be understood that the shafts, C, and D, may be replaced by a single flexible or jointed shaft of any well known construction extending from the socket, $K^9$, to the speedometer at, A, in which case, by virtue of the other drive connections from the propeller shaft, J, such flexible shaft, L, need have but a single bend, as indicated in Fig. 6.

I claim:—

1. A device for the purpose indicated, comprising a bracket arm, a pulley and its shaft journaled therein, said shaft being provided with a gear, a cavity formed in the arm to accommodate said gear, a cover plate for said cavity, a second gear in the cavity meshing with the first and having a shaft journaled in said cover plate, said shaft being adapted for operative connection with a measuring instrument.

2. A device for the purpose indicated comprising a bracket arm, a pulley and its shaft journaled therein, said shaft being provided with a gear, a cavity formed in the arm to accommodate said gear, a cover plate for said cavity, a second gear in the cavity meshing with the first and having a shaft journaled in said cover plate and provided with means for exterior connection for transmitting motion, said cover plate having a bearing for the shaft which is journaled in the bracket arm, said shaft being extended beyond the gear thereon for entrance into such journal bearing in the cover plate, the cover plate being adapted to be applied by movement longitudinally of the two shafts for entering the gears into mesh and the last-mentioned shaft into the cover plate journal bearing by the same movement.

In testimony whereof I have hereunto set my hand at Chicago, Illinois, this 20 day of June, 1913.

EDWARD A. LARSON.

Witnesses:
O. O. SAUTIREAU,
STANHOPE HUDSON.

Copies of this patent may be obtained for five cents each, by addressing the "Commissioner of Patents, Washington, D. C."